US010268638B2

(12) United States Patent
McKenna et al.

(10) Patent No.: US 10,268,638 B2
(45) Date of Patent: Apr. 23, 2019

(54) LIMITING PLAN CHOICE FOR DATABASE QUERIES USING PLAN CONSTRAINTS

(71) Applicant: ParAccel LLC, Campbell, CA (US)

(72) Inventors: William J. McKenna, Oceanside, CA (US); Richard L. Cole, Los Gatos, CA (US); Yijou Chen, Cupertino, CA (US); Sergei Perfilov, San Jose, CA (US); Aman Sinha, San Jose, CA (US); Eugene Szedenits, Jr., Ypsilanti, MI (US)

(73) Assignee: ParAccel LLC, Campbell, CA (US)

( * ) Notice: Subject to any disclaimer, the term of this patent is extended or adjusted under 35 U.S.C. 154(b) by 444 days.

(21) Appl. No.: 14/538,028

(22) Filed: Nov. 11, 2014

(65) Prior Publication Data

US 2015/0149435 A1    May 28, 2015

Related U.S. Application Data

(60) Provisional application No. 61/909,849, filed on Nov. 27, 2013.

(51) Int. Cl.
*G06F 16/2453* (2019.01)

(52) U.S. Cl.
CPC .............. *G06F 16/24544* (2019.01)

(58) Field of Classification Search
CPC .......... G06F 17/30463; G06F 9/4881; G06F 17/30477; G06F 17/30433; G06F 17/30442; G06F 17/30466
USPC .......... 707/718, E17.017, E17.014, E17.005, 707/719, 803, E17.012, E17.044, 707/E17.131, 609, 714, 769, 797, 802,
(Continued)

(56) References Cited

U.S. PATENT DOCUMENTS 5,956,706 A * 9/1999 Carey .................. G06F 17/3041
6,553,531 B1 * 4/2003 Kim .................. G01R 31/31813
714/739
(Continued)

OTHER PUBLICATIONS

Chekuri et al. ("Scheduling problems in parallel query optimization"; pp. 255-265; proceeding "PODS '95 Proceedings of the fourteenth ACM SIGACT-SIGMOD-SIGART symposium on Principles of database systems"; San Jose, California, USA—May 22-25, 1995; ACM New York, NY, USA © 1995; ISBN:0-89791-730-8).*

*Primary Examiner* — Jay A Morrison
*Assistant Examiner* — Ken Hoang
(74) *Attorney, Agent, or Firm* — Fenwick & West LLP (57) ABSTRACT

A database system allows users to specify plan constraint specification that limit choices of execution plans considered by an optimizer of the database system for optimizing database queries. The plan constraint specification specifies attributes of execution plans. The plan constraint specification may identify tables/intermediate results that the plan constraint is applicable to using table names or aliases. The database system applies the plan constraint specification to database queries that match the tables/aliases specified in the plan constraint specification. The database system limits the choice of execution plans evaluated for a database query to execution plans satisfying the attributes specified in an applicable plan constraint specification. The plan constraint specification may specify distribution of a table, a join order for tables, the join mechanism, cardinality of a table or intermediate result, and so on.

22 Claims, 5 Drawing Sheets

(58) Field of Classification Search
USPC ... 707/E17.056, E17.11, 602, 702, 713, 722,
707/737, 743, 744, 760, 774; 718/102,
718/104, 1, 100; 705/7.12, 36 R, 2, 27.1,
705/35, 14.43, 1.1, 26.1, 26.4, 301, 305,
705/342, 348, 500, 6, 7.15, 7.18, 7.23,
705/7.25, 7.27, 7.28, 7.29, 7.36, 7.37;
701/20, 19, 1, 102, 103, 2, 21, 23, 3
See application file for complete search history.

(56) References Cited

U.S. PATENT DOCUMENTS

| | | | | |
|---|---|---|---|---|
| 8,725,720 | B1* | 5/2014 | Ramesh | G06F 17/30466 |
| | | | | 707/713 |
| 9,201,923 | B2* | 12/2015 | Weng | G06F 17/30401 |
| 9,336,272 | B1* | 5/2016 | Thombre | G06F 17/30442 |
| 2005/0125398 | A1* | 6/2005 | Das | G06F 17/30306 |
| 2009/0293046 | A1* | 11/2009 | Cheriton | G06F 8/40 |
| | | | | 717/136 |
| 2009/0300033 | A1* | 12/2009 | Pandit | G06F 17/30923 |
| 2010/0250518 | A1* | 9/2010 | Bruno | G06F 17/30386 |
| | | | | 707/718 |
| 2011/0055237 | A1* | 3/2011 | Veanes | G06F 17/30634 |
| | | | | 707/759 |
| 2012/0221582 | A1* | 8/2012 | Boross | G06F 17/30572 |
| | | | | 707/752 |
| 2012/0330924 | A1* | 12/2012 | Rajan | G06F 17/30463 |
| | | | | 707/714 |

* cited by examiner

LIMITING PLAN CHOICE FOR DATABASE QUERIES USING PLAN CONSTRAINTS

CROSS REFERENCE TO RELATED APPLICATION

This application claims the benefit of U.S. Provisional Application No. 61/909,849 filed on Nov. 27, 2013, which is incorporated by reference in its entirety.

BACKGROUND

This application relates generally to database query optimization and in particular to using plan constraints for limiting plan choices for database queries.

Databases store large amount of data that is processed in response to database queries. Typically databases generate an execution plan for the queries. The execution plan comprises various operators and order of execution of these operators to process the database query. A database query optimizer typically evaluates several execution plans to select a particular execution plan for execution. The query optimizer selects the execution plan that the optimizer determines as the best execution plan for executing the database query. An execution plan is also referred to herein as a execution plan, a query plan or a plan.

Generating the optimal execution plan is a complex process that can take significant amount of time and resources depending on the complexity of the query being optimized. Therefore, query optimizers use heuristics to arrive at a solution faster even though the solution may not be optimal. However, as a result, optimizers can make incorrect decisions while generating the execution plan for a query.

Database experts often have knowledge about database queries that may be difficult for a query optimizer to determine. Therefore, database experts may be able to improve upon an execution plan generated by an optimizer. Some optimizers allow users to provide optimizer hints. However, conventional systems provide only a very limited expressive power for providing optimizer hints. Furthermore, the hints provided either drastically limit the plan choices considered by the optimizer drastically or are entirely ignored by the optimizer. Therefore, conventional techniques for allowing users to specify ways to help optimizers are limited in their expressive power and their ability to help the optimizer generate optimal plans.

SUMMARY

Embodiments disclosed herein allow users to specify plan constraints using a plan constraint language. A plan constraint specification provides directives to the query optimizer that restrict the execution plans evaluated by the query optimizer for database queries. The plan constraints may be specified independent of database queries. The database system receives a plan constraint specification identifying a plurality of tables. The plan constraint specification specifies attributes of potential execution plans. The database system matches the tables specified in the plan constraint specification with tables processed by a database query to determine whether the plan constraint specification is applicable to the database query. If the database system determines that the plan constraint specification is applicable to a database query, the database system optimizes the database query by limiting the search for execution plans to a set of execution plans that satisfy the attributes specified by the plan constraint specification. The database system selects an execution plan from the set of execution plans evaluated for executing the database query. The database system uses the selected execution plan for executing the database query.

Examples of attributes of execution plans that can be specified in a plan constraint specification include join order of tables, sizes of tables or intermediate results, distribution of tables, sort order of tables or intermediate results, and so on. The plan constraint specification may be used to force the optimizer to restrict the execution plans evaluated, thereby testing the query optimization in ways that the optimizer would not normally proceed for given queries. For example, the plan constraint may specify a particular table size independent of the actual table sizes, thereby forcing the optimizer to evaluate execution plans assuming the specified table size. Similarly, the plan constraint can limit the choices of join orders that are considered by the database system for optimizing a database query.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Databases allow users to interact with the data stored in the database using a structured query language (SQL) interface. The SQL language allows users to execute SQL statements that can access and manipulate data from the database. A query optimizer generates execution plans for the database queries for execution. The query optimizer enumerates several plans choices and evaluates these plan choices to select an execution plan for executing the database query.

Embodiments disclosed herein allow users to specify plan constraints using a plan constraint language. The plan constraints provide directives to the query optimizer that restrict the execution plans evaluated by the query optimizer for database queries. The plan constraints may be specified independent of database queries. For example, a plan constraint may be specified as command that is independent of the commands used to specify the database queries. The optimizer matches the plan constraints specification to database queries based on criteria specified in the plan constraints and applies them to all queries that match the criteria. Accordingly, a plan constraint specification may be applicable to a single query or to a set of queries.

The plan constraint specification allows a user to force the query optimizer to restrict the execution plans evaluated, thereby testing the query optimization in ways that the optimizer would not normally proceed for given queries. For example, the optimizer may select particular execution plans if the input tables have certain number of rows. The user can provide plan constraints that specify arbitrary table size independent of the actual table sizes, thereby forcing the optimizer to generate plans for table sizes that do not correspond to the actual table sizes. Similarly, the user can force specific join orders or limit the choices of join orders that are considered by the optimizer while selecting a join order.

The plan constraint specification may be used to limit the shape of a join tree or the order in which tables are joined for a query. The plan constraint specification may be used to limit the choice of a physical operator or join key choices for a join operation in a query. The plan constraint specification may be used to limit the choice of distribution of table data across processors of a multi-processor system. The plan constraint specification may be used to specify a cardinality value for an intermediate result, intermediate table, subquery result, or input table for a query. The optimizer generates plans assuming the specified cardinality value, whether or not that cardinality value reflects an accurate measure of the cardinality of the corresponding data set.

According to an embodiment, plan constraints are treated by a query compiler differently compared to optimizer hints allowed by conventional databases. Optimizer hints comprise specification provided by users for SQL statements that may optionally be used by the optimizer to generate efficient execution plan. However, the optimizer is typically free to use the hint or ignore it. In contrast, plan constraints are directives that the optimizer is required to use and cannot ignore. However, in other embodiments, plan constraints may be treated as optional by the optimizer such that the optimizer ignores them if the optimizer determines that it can generate a better execution plan.

The following example illustrates processing of plan constraints by the database system. The following is an example database query processed by a database system. The table t1 has columns a1, b1, and c1 and table t2 has columns a2, b2, and c2. The query joins tables t1 and t2.

SELECT 1 FROM t1, t2 WHERE a1=b2 and b1=c2;

Assume that the query optimizer uses a hash join to process the query and the user would like to investigate how the query performs if merge join were used. The database system receives the following plan constraint specification.

SET PLAN_CONSTRAINT TO '(t1)<any>(t2)<any>(% mj) (t1.b1 t2.c2)';

The plan constraint specifies that the optimizer should join table t1 with t2. The distribution of table t1 and t2 can be any distribution, which is specified using the token <any> after the list containing t1 and the list containing t2. The token % mj specifies that merge join algorithm should be used to join the tables. Additionally, the plan constraint specifies that the join keys for the merge join are t1.b1 and t2.c2. Accordingly, the execution plan will apply the predicate, a1=b2 in the WHERE clause as a join filter. This plan constraint specification forces the query planner to use the merge join algorithm to join the tables t1 and t2 irrespective of what the optimal join algorithm should be.

An execution plan may be considered as having several attributes that describe the execution plan. For example, an attribute may describe the distribution of a table, the join order for a set of tables, the columns to be used for performing the join, the type of algorithm to be used for performing the join, and so on. If all attributes of an execution plan are specified, the optimizer has no more choices left and has to execute the resulting execution plan. However, if a subset of attributes of execution plans is specified or if attributes are limited to sets of values or ranges of values (rather than specific values), the optimizer has a set of alternatives to evaluate to determine the values of the remaining attributes. The larger the number of attributes specified in a plan constraint, the fewer choices are left for the optimizer to select from. Similarly, if the plan constraint specifies very few attributes, the optimizer has more choices to select from. Accordingly, the plan constraint allows a user to limit the execution plan choices that the optimizer considers without specifying the complete details of execution plan.

Parallel Database System

Figure 1:
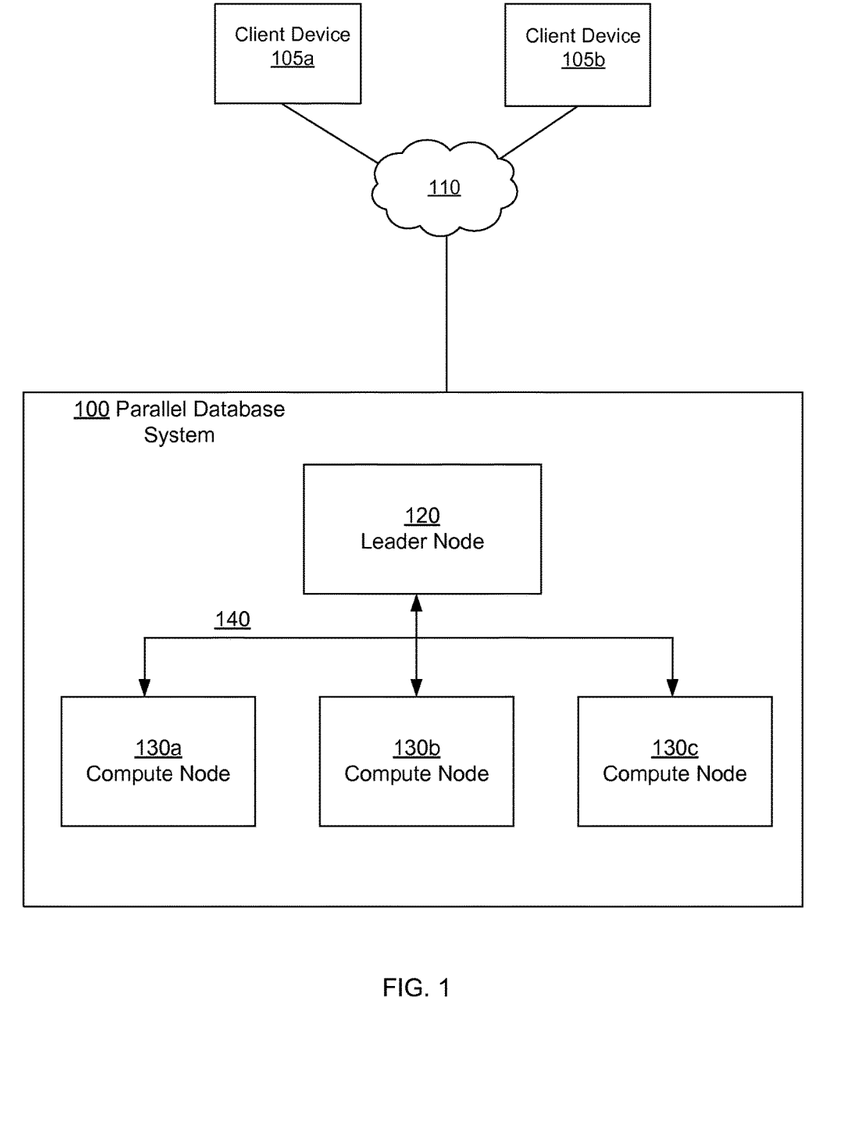
FIG. 1 shows the architecture of a parallel database system, in accordance with an embodiment of the invention.

FIG. 1 shows the overall system environment illustrating the architecture of a parallel database system 100, in accordance with an embodiment of the invention. The parallel database system 100 has four main architectural components: a leader node 120, one or more compute nodes 130, a parallel communication fabric 140, and an optional storage area network (SAN) (not shown in FIG. 1). (A letter after a reference numeral, such as "130a," indicates that the text refers specifically to the element having that particular reference numeral, while a reference numeral in the text without a following letter, such as "130," refers to any or all of the elements in the figures bearing that reference numeral.)

Although the system described herein is a parallel database system, techniques disclosed herein apply to a database system executing on a single processor. The plan constraint specifications can be used for a parallel database or for a database executing on a single processor. Some of the attributes of execution plans specified in plan constraints described herein are applicable specifically to parallel databases, for example, distribution of a table. Other attributes are applicable to both parallel databases and single processor databases. However, if a plan constraint specifies attributes specific to a parallel databases, a single processor database system can ignore these attributes since they are not applicable to a single processor system.

The leader node 120 controls the execution of the compute nodes 130. All nodes 120, 130 communicate with each other via the parallel communication fabric 140. The leader node 120 and the compute nodes 130 can comprise any type of processor, for example, standard x86 servers running Linux or multi-core systems. Users and applications may communicate with the system via the leader node by using standard interfaces, ANSI SQL via ODBC/JDBC (in general, "the system" or "database system" or "database" refers to a parallel database system 100 herein.)

The leader node 120 may be connected to the network 110 and may interface with external applications and other computers using the network. A leader node manages communications with the compute nodes. In an embodiment, the leader node controls sessions, parsing and optimizing queries, and scheduling execution of the workload. The leader node may or may not participate in data operations. The leader node may be optimized for outward communication and handling of query overhead so the resources of the compute nodes are utilized for performing data operations.

Compute nodes 130 are the components of the parallel database system 100 that perform processing and storing of data. Each compute node 130 stores and manages a subset of rows of each table. For example, if a table has 1 billion rows and there are 20 compute nodes, then approximately 50 million rows may be distributed to each compute node 130.

Data may be distributed to a particular compute node 130 based on a particular data distribution strategy, for example, based on a hashing algorithm applied to a distribution key, or by round robin. Distribution keys, such as the primary key or other popular join column may be used for even distribution of data, especially when queries are likely to benefit from collocated joins by using the same distribution key. In cases where an inherently balanced distribution key isn't obvious or doesn't exist, round robin distribution may be used to balance the data.

By utilizing multiple methods of data distribution, it is possible to maintain the appropriate balance between data distribution and performance so the parallel database system 100 can take best advantage of its resources and provide good parallel efficiency. The performance of the parallel database system 100 is driven by the number of compute nodes 130 present. For example, with most applications, a 50-compute node system may perform almost 5× faster than a 10-compute node system.

Each compute node 130 depends on a set of processes to manage resources of that node, for example, communication, and secondary storage. In order to achieve maximum parallelism, the parallel database system 100 logically partitions data for all tables into multiple subsets per node so that multiple cores can be used to process the data for those tables during queries. These logical partitions are referred to as "slices", and in an embodiment, the number of slices for a node is typically configured to correspond to the number of cores in that node. In certain contexts, a slice refers to the portion of data that is allocated to a process (or core) for processing. Each slice is given a set of query execution processes at system startup, and parallelism is achieved by having the processes of all slices competing for the node's shared resources. Slices communicate with other slices via the communication fabric.

In an embodiment, the communication fabric 140 is a high performance fabric based on standard, 1 or 10 Gigabit Ethernet (GbE) and standard multi-port switches that have full crossbar support. The communication fabric 140 may use a custom protocol to enable highly efficient communication among each of the nodes (leader and compute). The communication fabric 140 is designed to maximize interconnect performance in a complex, parallel database environment. For example, communication fabric 140 is configured to efficiently handle movements of large intermediate result sets, data redistribution, low rate of packet loss and so on. In some embodiments, communication fabric 140 uses multiple links simultaneously running multiple data streams. The communication fabric 140 may be implemented as multiple independent networks all communicating data for the parallel database system 100. In some embodiments, the parallel database system 100 can utilize multiple communication fabrics 140 for increased performance.

Client devices 105 are computing devices that execute client software, e.g., a web browser or built-in client application, to interact with the parallel database system 100 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that send interact with a database system.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the parallel database system 100 are typically performed via a network 110, for example, via the internet. The network 110 enables communications between the client device 105 and the parallel database system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

System Architecture

Figure 2:
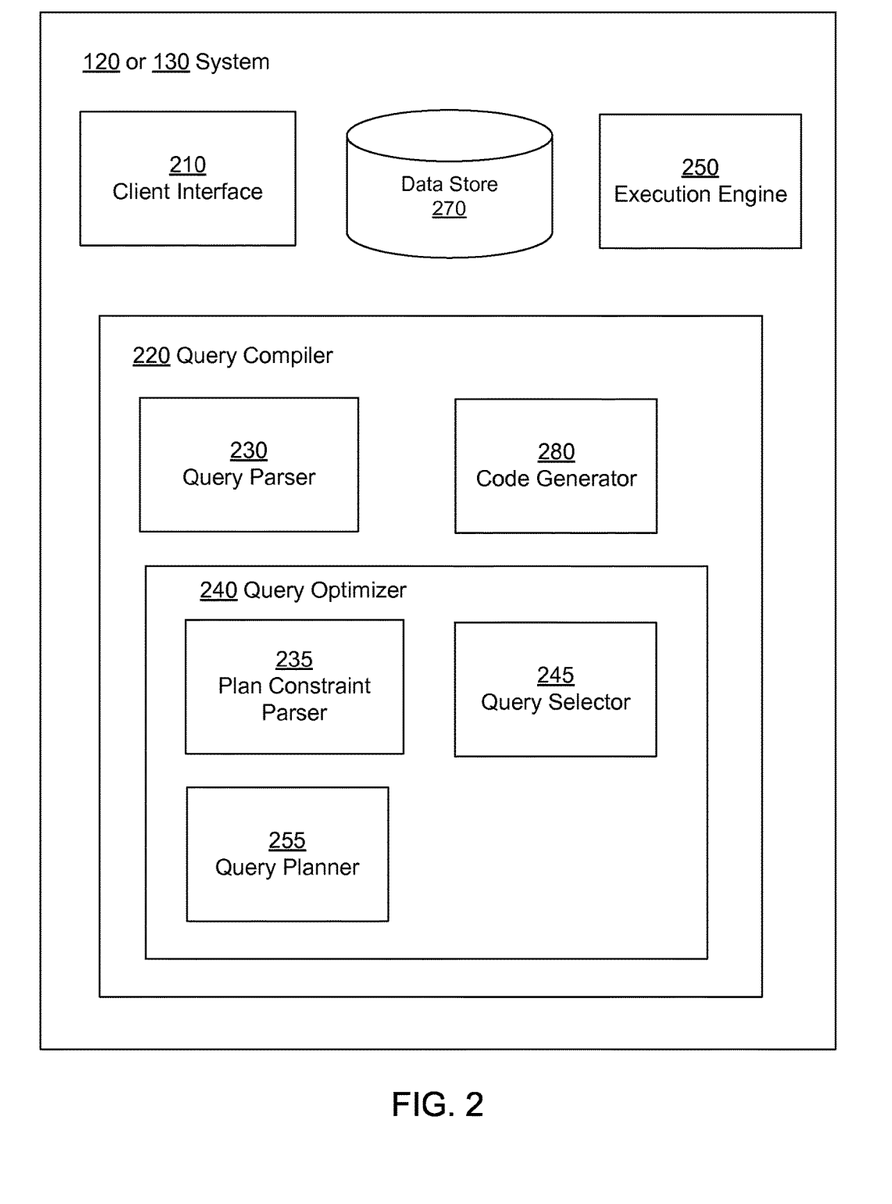
FIG. 2 shows a high level view of internal components and functionality provided by parallel database system, in accordance with an embodiment.

FIG. 2 is a high level block diagram illustrating the system architecture of a node 120, 130 of the parallel database system, for example the leader node 120 or the compute node 130, in accordance with an embodiment. The compute nodes implement a set of processes that manage communication with the leader node to receive commands, send back data, and route compiled code to individual query processes (for each core or slice on the compute node) to execute for a given query.

The node 120 or 130 comprises a client interface 210, a query compiler 220, an execution engine 250, and a data store 270. In alternative configurations, different and/or additional modules may be included in the system. The client interface 210 allows a node to interact with client devices 105 or with external systems. Typically the leader node 120 interacts with client devices 105. However compute nodes 130 may interact with external systems, for example, to import or export data. When a new client request comes in to perform a query or some other type of database operation, the system of node 120 spawns a new process to maintain session information for that client. That process is maintained as long as the client session remains open and that client is sending query requests to the leader node 120.

The data store 270 stores the data on a persistent storage, for example, a hard disk. This data includes relations or tables comprising rows and columns of user data. The query compiler 220 compiles each query to generate a plan for execution of the query and performs any optimizations needed. The query compiler 220 comprises components including a query parser 230, a query optimizer 240, and a code generator 280. The query parser 230 parses an input query to ensure that there are no syntax errors in the query. If a well formed query is provided to the database system 100, the query parser 230 builds appropriate data structures to perform further processing of the query, for example, query optimization or code generation. The query optimizer 240 performs optimizations to ensure that a query runs fast.

In an embodiment, the query optimizer 240 comprises components including a query selector 245, a query planner 255, and a plan constraint parser 235. The query optimizer 240 performs transformations on the query, for example, by rewriting the query to generate a transformed query that can be executed more efficiently. The query planner 255 generates an execution plan for executing a query. The query planner 255 generates an execution plan by traversing through a search space comprising various execution plans applicable to a given query. For large and complex queries, the search space of the execution plans can be very large and traversing through the search space can be a slow process.

The plan constraint parser 235 parses plan constraint specifications received. The query selector 245 matches a plan constraint specification against database queries to determine which database queries are applicable to a plan constraint specification. The query selector 245 selects the matching database queries for generating their execution plans based on the plan constraint specification. The plan constraint specifications reduce the search space that the query optimizer 240 traverses by specifying values of attributes of potential execution plans considered by the optimizer. Accordingly, the query planner 255 tries fewer variations of these attributes while exploring the various options of execution plans for the query.

The execution engine 250 executes the database query by executing an execution plan provided by the planner 290. The plan constraints may be applied during enumeration of the search space or during top-down plan search process. For example, the query planner 255 may skip generation of an execution plan or a set of execution plans based on criteria specified in the plan constraint specification.

Execution of a Query in the Parallel Database System

The following steps detail the operations performed during processing of client request from its initial creation to sending results or status back to the client, to complete the request. After creating a process to maintain the connection with a new client, the system 100 routes the requested operation (a SQL query or some other database operation) through the parser and optimizer to develop a query execution plan to perform or execute the specified query or database operation.

Figure 3:
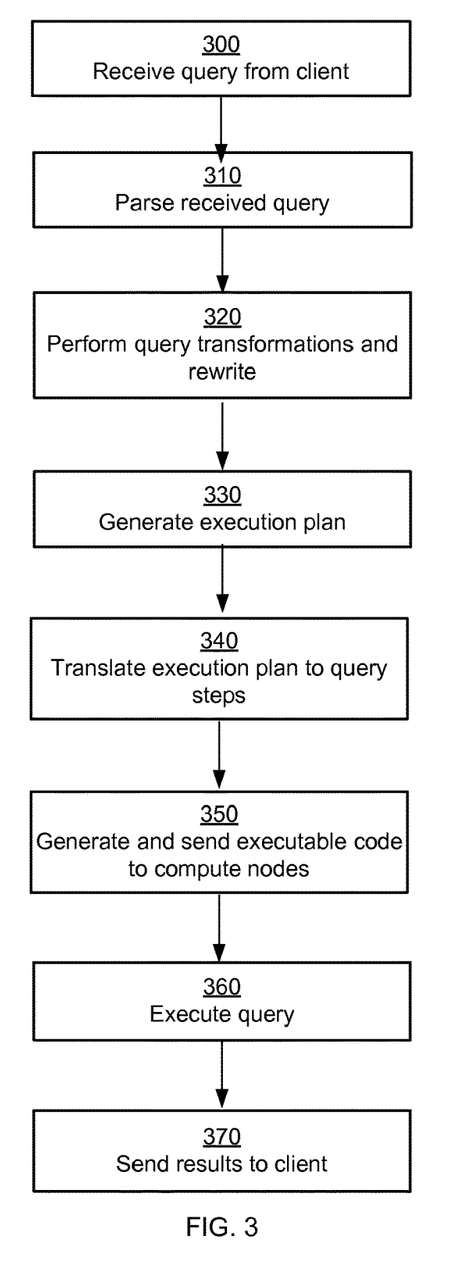
FIG. 3 shows a flowchart for illustrating the processing of a query in the parallel database, in accordance with an embodiment.

FIG. 3 shows a flowchart for illustrating the processing of a query in the parallel database, in accordance with an embodiment. These steps may be performed in orders other than those shown in FIG. 3. Furthermore, each step of the flowchart can be performed by modules different from those indicated below.

The leader node 120 receives 300 a database query from a client 105, for example, an SQL query. The query parser 230 parses 310 the query received to generate a data structure representing the query. The query optimizer 240 performs 320 various transformations on the query, for example, by rewriting the query. The query planner 255 generates 330 an execution plan for the input query. The execution plan may specify execution choices, such as join type, join order, aggregation options, and data distribution requirements. The execution engine 250 translates 340 the execution plan into sequences of query steps. The execution engine 250 generates 350 and sends executable code to various compute nodes.

Each compute node 130 executes 360 the query for the portion of data present on the compute node. Each compute node 130 may be considered divided into slices, typically one slice per core or processor. Each slice is associated with a portion of data. The slices on each node share the server's memory and disk space to parallelize the workload for a query or other database operation sent to all the compute node servers.

Each compute node 130 includes a communication layer for communicating, for example, with the leader node and a dispatcher that assigns a particular query task to corresponding slice query processes available to execute queries within each compute node. Each slice can have a pool of separate processes that can independently run compiled query code for a slice of data associated with a query task or other database operation. Additional communication processes handle the transfer of commands and data back and forth between the leader node 120 and compute nodes 130 associated with the execution of specific query tasks. The compute nodes determine the result of execution of the query and communicate the result to the leader node. The leader node receives the results and sends 370 the results to the client that sent the query.

In an embodiment various query steps correspond to operators in execution plans. Examples of operators identifying query steps include, HASH, which builds hash table for use in hash joins, HJOIN, which executes hash join of two tables or intermediate result sets, MERGE, which merges rows derived from parallel sort or join operations, SCAN, which scans tables or intermediate result sets, either sequentially or with a range-restricted scan, SORT, which sorts rows or intermediate result sets as required by other subsequent operations (such as joins or aggregations) or to satisfy an ORDER BY clause, DIST, which distributes rows to nodes for parallel joining purposes or other parallel processing, and NLOOP, which executes a nested-loop join of two tables or intermediate result. Embodiments allow a user to use a command, for example, "explain" command that provides a description of the execution plan generated.

Processing Plan Constraints

Figure 4:
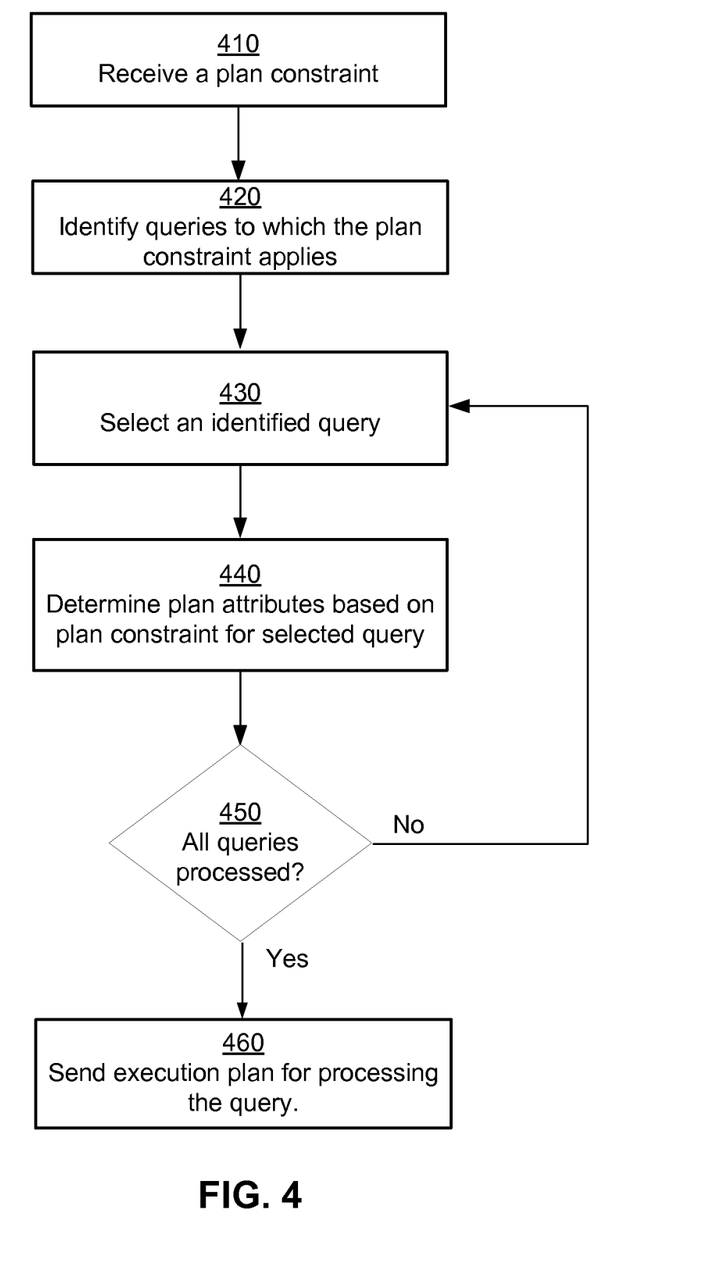
FIG. 4 shows a flowchart for illustrating the processing of a plan constraint in a database system, in accordance with an embodiment.

FIG. 4 shows a flowchart for illustrating the processing of a plan constraint specification in a database system, in accordance with an embodiment. The query compiler 220 receives 410 a plan constraint specification. The plan constraint parser 235 parses the plan constraint specification received. In an embodiment, the plan constraint parser 235 builds a representation of the plan constraint specification, for example, a parse tree representation or any other data structure representing the plan constraint.

The plan constraint specification may specify plan constraints as commands (or statements.) The plan constraint statements are specified independent of database queries. Accordingly, a plant constraint statement may be applicable to multiple database queries.

The query selector 245 identifies 420 queries that are applicable to the plan constraint. In an embodiment, the query selector 245 determines whether the attributes of execution plan specified in the plan constraint are applicable to specific queries. For example, if the plan constraint specifies that the plan constraint is applicable to two tables T1 and T2, the query selector identifies 420 queries that process T1 and T2 and applies the plan constraint to the selected queries. Similarly, if the plan constraint specifies a table that is not processed by a query, the query selector determines that the plan constraint is not applicable to that particular query.

The query selector 245 may attempt to match the plan constraint specification against any query that is encountered by the database system. Alternatively, a user can specify a list of queries that the plan constraint specification should be matched against. For example, the user may specify that the plan constraint specification should be matched against queries specified in a script file. In an embodiment, the user specifies a set of queries for matching against a plan constraint specification, for example, query set S1={Q1, Q2, Q3}.

The query selector 245 selects 430 an identified 420 query that matches the plan constraint specification and provides the selected query to the query planner 255 for generating an execution plan. The query planner 255 generates the execution plan by determining 440 plan attributes based on the plan constraint. In an embodiment, the query planner 255 determines 440 plan attributes that are not limited by a plan constraint. Accordingly, the query planner 255 searches through the space of execution plans that are available after the values specified by the plan constraints are fixed.

The query optimizer 240 verifies 450 whether all queries to which the plan constraint is applicable have been processed. If there are queries remaining to be processed, the query optimizer 240 repeats the steps 430, 440, and 450. If all the queries are processed, the query optimizer 240 sends the plans for execution to the execution engine 250. The query optimizer 240 may store the generated execution plans for each query. In an embodiment, the plan constraints are applied during enumeration of the search space or during top-down plan search process. The above steps may be performed in an order different from that specified in FIG. 4. For example, the query optimizer 240 may send the generated plans for the execution engine 250 as the plans are generated, rather than wait for all execution plans to be generated.

Plan Constraints Specification

In an embodiment, the plan constraints are specified using a plan constraint language. Each plan constraint specification may be specified by a string conforming to the syntax of the plan constraint language. Alternatively the plan constraint specification may be provided an XML string or any other format, for example, a Javascript Object Notation (JSON) format. The plan constraint may be specified as a command or statement for the database system. Alternatively, the plan constraint may be specified using an application programming interface (API).

In one embodiment, a plan constraint specification comprises a list of table names or aliases. The query optimizer 240 applies the plan constraint to queries that process all the tables from the list of tables. Alternatively, if the plan constraint specifies tables or subquery aliases, the query optimizer applies the plan constraint to all queries that specify aliases for tables or subqueries corresponding to the aliases specified in the plan constraint. Each plan constraint specification corresponding to a table name or alias can optionally specify a distribution. The distribution specification describes how the table should be distributed across processors of a multi-processor architecture. Furthermore, the plan constraint may specify a cardinality value associated with a table, alias, or a string that evaluates to a table, for example, a join expression. The optimizer generates plans assuming the specified cardinality value, whether or not that cardinality value reflects an accurate measure of the cardinality of the corresponding data set.

The tables used in example queries are t1, t2, t3, . . . tn. Each table ti includes columns ai, bi, and ci. For example, table t1 includes columns a1, b1, and c1, table t2 includes columns a2, b2 and c2, table t3 has columns a3, b3, and c3, and so on. The following example illustrates how a cardinality value can be specified for an intermediate result obtained by joining two tables and how order of joining a set of tables can be specified. The following query joins tables, t1, t2, t3.

SELECT 1 FROM t1, t2, t3
WHERE t1.a1=t2.a2 AND t2.b2=t3.b3 and t2.c2=t3.c3;
The following plan constraint specifies to the query optimizer that table t2 should be joined with table t3 before joining the result to t1. The plan constraint specifies that merge join should be used for the first join, and table t1 should be broadcast. The plan constraint specifies that hash join should be used for the join to t1. Furthermore, the plan constrain specifies that the optimizer should generate a plan as if the cardinality of the result obtained by joining tables t2 and t3 were 10,000. The plan constraint language allows use of parenthesis to specify an order of processing of tables. In an embodiment, the execution plan processes tables in the same order in which an expression evaluator would process sub-expressions of an expression with identical nesting of parenthesis.

SET PLAN_CONSTRAINT to
'((t2)<any>(t3)<any>(% mj) (t2 t3)) % card 10000<any> (t1) % db (% hj) (t1 t2)'

Grouping the specification of tables t2 and t3 in parenthesis as "((t2)<any>(t3)<any>(% mj) (t2 t3))" specifies that t2 and t3 should be joined first to form a join group. This group is then joined to table t1. The distribution '% db' after t1 specifies that the table t1 should be broadcast. The operator '% mj' applies to tables t2 and t3 and specifies that the join of t2 with t3 should be performed using merge join. The operator '% hj' applies to the join between the result of join of t2 and t3 and the table t1, and specifies that this join should be performed using hash join mechanism. The portion of specification '(t2 t3)' specifies the columns used to join tables t2 and t3. Since this substring specifies a list of tables instead of join keys, all columns used in the query in the predicate that connect the join inputs are used in the join condition. In contrast, if this portion of the plan constraint specified (t2.c2 t3.c3), the columns t2.c2 and t3.c3 are used for joining the tables t2 and t3 and the remaining columns (t2.b2 and t3.b3) used in the predicate are used to filter the join result.

Following are various elements of the plan constraint specification according to an embodiment. These include table constraints, join group constraints, query block constraints and so on. Each of these is described in further details.

A table constraint is a plan constraint applied to a particular table. The table constraint identifies a table by using the table name or an alias that may be used in a query. If the table constraint specifies a table alias, the optimizer applies the plan constraint to queries that use the specified table alias. A table constraint may comprise various optional parameters including, the cardinality or number of result rows expected from the table, specification of distribution of the table, for example, in a parallel architecture, and whether the data of the table is stored in a sorted order. The cardinality of a table is specified by providing a row count. The table constraint may specify that the table should be distributed using a hash distribution based on a specified column or using a round robin strategy. The table constraint may specify that the table data should be sorted by a particular column.

An example table constraint is "t1% card 100% dh t1.b1% sort t1.a1." The example table constraint applies to table t1. The example table constraint uses the keyword "% card" to specify the cardinality of the table as 100. If the cardinality of the table is specified as a particular value (say N), the optimizer generates plan for executing the query assuming the cardinality as N, irrespective of the actual number of rows of the table or the statistics corresponding to the table that are stored in the system for use by the optimizer. The example table constraint uses keyword "% dh" to specify that the query should be optimized as if the table t1 is hash distributed using the column t1.b1, which is the fully qualified name of column b1 of table t1. The example table constraint uses keyword "% sort" to specify that the query should be optimized as if the table t1 is sorted by the column t1.a1.

The plan constraint specification allows a user to specify a group of tables to specify a join order enumeration. Each group of join orders is processed separately for join order enumeration. Subsequently, the intermediate results of the individual groups of tables are joined. For example, a user can specify a plan constraint with two table lists "(t1 t2 t3) (t4 t5 t6)." The optimizer processes each list of tables separately to determine join orders. For example, the optimizer determines join order of tables (t1 t2 t3) independent of the join orders of tables (t4 t5 t6). In other words, the optimizer does not consider binary joins between the tables from one list with a table from the other list. The optimizer considers join order of the two lists, for example, whether the join order processes the first list followed by the second list or the second list followed by the first list. The optimizer evaluates only the execution plans for these join orders for determining the execution plan for executing the query.

The plan constraint specification allows a user to specify a plan constraint that applies to a join, called a join group. A join group constraint specifies a table list or a group of other join groups. A user can provide optional parameters for a join group, for example, a cardinality for the join group. The cardinality for the join group specifies a number that the optimizer is expected to use as the number of result rows obtained by processing the join group for optimizing the query. The ability to specify a cardinality of the table allows a user to provide estimates of table sizes in case the user has domain knowledge that may not be available to an optimizer. As an example, a user may have knowledge of table sizes that are used in the field and may not have the same data sizes in a test environment. The user can reproduce the execution plan that would be generated in the field by specifying the appropriate table sizes, thereby overriding the actual table sizes of the tables for purposes of optimizing the database queries.

The join group constraint optionally specifies a distribution for the intermediate result generated by the join. The distribution for the intermediate result can be one of, hash distribution by a column of a table, broadcast, evenly distribution, i.e., round robin, or "<any>" indicating there is no constraint on the distribution and any distribution strategy may be used. The broadcast distribution specifies that the intermediate result should be broadcast to all nodes of the parallel architecture where data from another table or intermediate result is present. The data from the other table or intermediate result may be hash distributed or evenly distributed.

The join group constraint may specify that a particular table from the group must be used in all two-table joins. For example, if the table group is (t1, t2, t3, t4), and the join group constraint specifies that t3 must be included in all two-table joins, the pairs of two-table joins generated will be (t3, t1), (t3, t2), and (t3, t4). The join group constraint may specify the physical join operator to be used for joining two tables of intermediate results. For example, the join operator may be specified to be a hash-join operator, a merge join-operator, a nested-loop-join operator, semi-join operators, outer join operators and so on. The join constraint may specify that the join inputs must be joined in the order in which they are specified in the constraint.

The physical join operators may be specified as a list of alternatives. Accordingly, the choice of physical join operator is limited to be one of the specified list. The join constraint may specify the join keys to be used for a join operation. The join key may be specified as columns or tables. If join keys are specified as tables, the join is formed using all applicable predicates that connect the input. If join keys are specified as columns, the join is formed using only the columns specified as join keys. The remaining predicates are used as a filter to the join result obtained by performing the join using the specified join keys.

The query block constraint specification is a constraint on a particular query block. A query block represents a portion of a query, for example, a subquery. The query block constraint includes a join group constraint as described herein. The query block constraint may optionally specify a block id to identify the query block that the query block constraint is applicable to. The query block may be identified by a block name, for example, an alias specified in the query. A user may use a command to determine the query block ids for a given query.

The query group constraint may optionally specify a physical operator to constrain the physical operator choice for performing an aggregation in the block, if one exists. For example, the physical operator choice for a query group constraint may be a hash aggregation operator, a sort aggregation operator, a partial sort aggregation operator, a sort unique operator, or a hash unique operator. If a constraint matches a query block but the optimizer cannot generate a plan that satisfies the constraint, then the optimizer provides a message indicating that no plan can be generated.

The following example illustrates use of query block constraints. The input query is as follows:

SELECT 1 FROM
(SELECT SUM(a1) AS a1 FROM t1, t2 WHERE a1=a2) AS dt1,
(SELECT SUM(a3) AS a3 FROM t3, t4 WHERE b3=b4) AS dt2 WHERE a1=a3

The user can determine the block ids corresponding to each block of the query, for example, by using an "explain" command. Assume that the block id for dt1 is 3 and the block id for dt2 is 2. Multiple constraints with block ids can be used to associate constraints with blocks, for example, as follows:

% bid 3 (t1)<any>(t2)<any>(% mj) (t1 t2); % bid 2 (t3)<any>(t4)<any>(% hj) (t3 t4)

The above plan constraint specifies two query block constraints separated by a semicolon (or any separator supported by the plan constraint language). The first query block constraint is specified for block id 3 and the second query block constraint is specified for block id 2 (the block id is specified by the token "% bid"). However, since the optimizer matches the input tables for a plan constraint with a query, the optimizer can match the plan constraints with the two query blocks even if the query block ids are not specified. For example, the first query block constraint in the above plan constraint (i.e., "% bid 3 (t1)<any>(t2)<any>(% mj) (t1 t2)") is applicable to tables/aliases t1 and t2 and only the query block with alias dt1 uses tables t1 and t2. Accordingly, the first query block constraint is applicable only to query block with alias dt1, whether or not the query block id is specified in the query block constraint. Similarly, the second query block constraint (i.e., "% bid 2 (t3)<any>(t4) <any>(% hj) (t3 t4)") is applicable to tables/aliases t3 and t4 and only query block corresponding to dt2 uses table st3 and t4. Accordingly, the optimizer can only apply the second query block constraint to the query block with alias dt2, whether or not the query block id is specified in the query block constraint.

However, a constraint may match multiple query blocks if the block id is not specified. If a plan constraint is expected to match a particular query block, the plan constraint should specify the query block id to identify that particular query block. The following query provides an example in which the input plan constraint is applicable to two query blocks.

SELECT 1 FROM
(SELECT b1 FROM t1 AS foo, t2 AS bar WHERE b1=b2
GROUP BY b1) AS foo, t2 bar WHERE b1=b2;

In the above query, both the inner query block and the outer query blocks apply to aliases foo and bar. Accordingly, the following query block constraint would be applicable to both inner and outer query blocks.

(foo) % dr (bar) % db (% mj) (foo.b1 bar.b2)

If the user wants a different plan constraint for each query block then the user must specify two plan constraints and use query block ids to specify which plan constraint is applicable to which query block. In an embodiment, the optimizer matches query block constraints against query blocks in the order they appear in the plan constraint specification until a match is found or all constraints have been tried. The optimizer returns a success or failure message, depending on whether the optimizer succeeds or fails in applying the query block constraint.

Examples of Plan Constraints

Examples of usage of plan constraints for database queries are presented. The following constraints are applicable to the database query "select a1 from t1, t2 where a1=a2." The plan constraint "(t1)<any>(t2)<any>(% hj) (t1.a1 t2.a2)" specifies that the optimizer should consider only plans based on hash join between t1 and t2 as specified by the token '% hj'. This plan constraint uses the token '<any>' after tables t1 and t2 to specify that the tables t1 and t2 can have any distribution strategy.

The plan constraint '(t1) % dh (t1.a1) (t2)<any>(% hj) (t1.a1 t2.a2)' provides the distribution of the table t1 as '(t1) % dh (t1.a1).' This portion of the plan constraint specifies that the optimizer should consider execution plans based on hash distribution of table t1 on column t1.a1.

The plan constraint '(t1) % dh (t1.a1) (t2)<any>(% mj) (t1.a1 t2.a2)' uses the token '% mj' to specify that the join between t1 and t2 should be a merge join. Accordingly, this plan constraint specifies that the optimizer should consider plans that perform merge joins with hash distribution on t1.a1.

The plans constraint '(t1% card 100)<any>(t2% card 200)<any>(<any>) (t1.a1 t2.a2)' is applicable to database query "select a1 from t1, t2 where a1=a2 and b2=2 and c2=2." This plan constraint specifies that the cardinality of table t1 should be assumed to be 100 and cardinality of table t2 should be assumed to be 200 by specifying 't1% card 100' and 't2% card 200' respectively. The optimizer can select any distribution and join operator as specified by the token '<any>' in appropriate places in the plan constraint.

The plan constraint "(t3 t1)<any>(t2)<any>(<any>) (t1.a1 t3.b3 t2.a2 t2.b2)" is applicable to query "select 1 from t1, t2, t3 where a1=a2 and b3=b2." This plan constraint specifies a table list "(t3 t1)" that forces t1, t3 to be the left input. Furthermore, there is no condition in the join predicate that connects t3 directly to t1 in the join graph of the query. Therefore, the directive "(t3 t1)" forces the optimizer to join t1 and t3 together, independent of t2. As a result, the only execution plans that are considered by the optimizer are the ones that compute the cross product of t3 with t1 using a nested loop join. Therefore, the plan constraint controls the choices left with the optimizer since only a limited number of alternatives lead to feasible execution plans. The optimizer eliminates the plans that are not feasible for the given plan constraint.

Applications of Plan Constraints

Plan constraints can be used for performance debugging. For example, if a query is performing inefficiently, a user can view the execution plan and try alternative execution plans. For example, the user can specify different plan constraints and see how the query performs with each plan constraint. The plan constraint specification allows a user to force an execution plan even if it is not an optimal execution plan that the optimizer would select. This allows performance testing of queries. For example, the optimizer plan may select different execution plans depending on different cardinality values of certain intermediate results.

It may be difficult for a user testing the query to provide the correct size of input so that the intermediate table is generated with specific sizes so as to force the optimizer to select specific execution plans so as to study their characteristics. Instead a user can use the plan constraint specification to specify certain cardinality for an intermediate result or any input table, thereby forcing the optimizer to use the specified cardinality instead of the actual size or an estimated value of the intermediate result.

A user may also be able to define certain patterns that limit the choices of execution plans considered by an optimizer. For example, if the user has specific information about the input data and knows that a certain type of distribution would be effective or certain type of join operation would be ideal for the given input, the user can use the plan constraints to specify these specific attributes of the plans that are evaluated by the optimizer.

Similarly, a user may identify an issue with the optimizer's selection of execution plans. For example, the user may identify that an optimizer consistently makes a wrong choice of execution plan in a specific situation. In this case, the user can use the plan constraints specification to override the choice of the optimizer.

Figure 5:
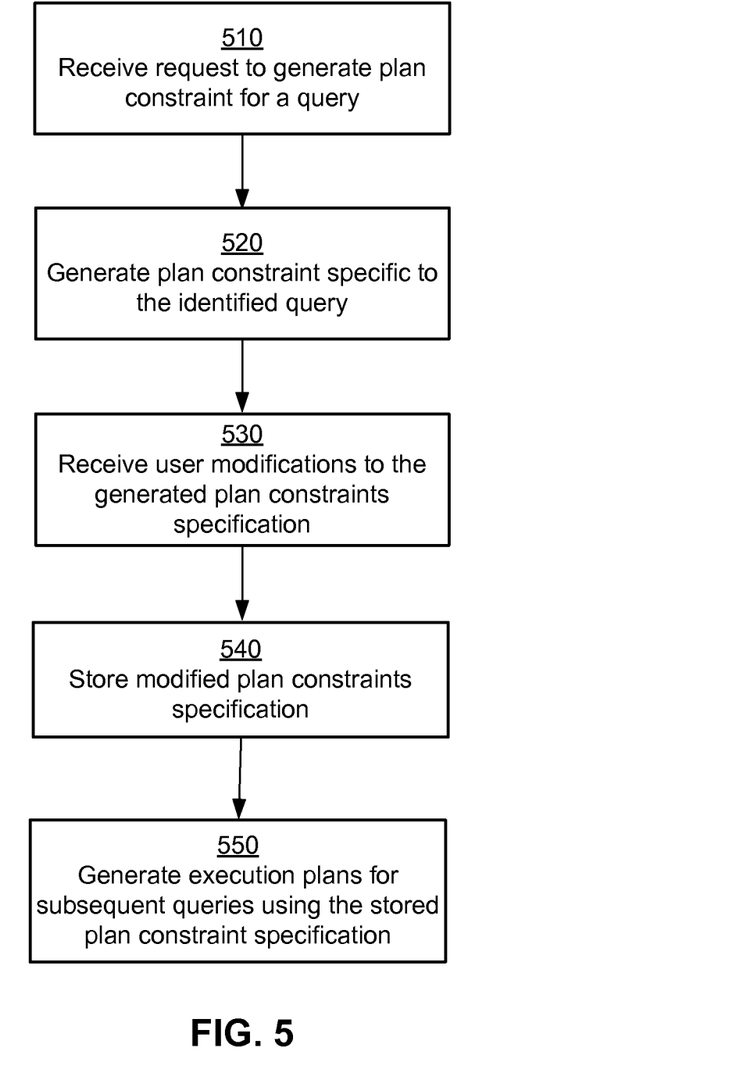
FIG. 5 shows a flowchart for illustrating the process of modifying a system generated plan constraint, in accordance with an embodiment.

FIG. 5 shows a flowchart for illustrating the process of modifying a system generated plan constraint, in accordance with an embodiment. A user can request the optimizer to generate a plan constraint for a given query. Accordingly, the optimizer 510 receives a request to generate the plan constraint for a specific query. The request identifies a specific query. The optimizer generates 520 the plan constraint for the identified query. The generated plan constraint corresponds to the execution plan that the optimizer selects for execution of the identified query. The database system stores the generated plan constraint specification.

The plan constraint specification is provided using the syntax of the plan constraint language that is user friendly. Therefore, a user can review the plan constraints generated by the optimizer. The user may modify the plan constraint specification. For example, the user may modify a distribution of a particular table, the type of join between two tables, or the join order of a set of tables. The optimizer receives 530 the user modifications to the plan constraint specification. The optimizer stores 540 the modified plan constraint specification. The optimizer generates 550 execution plans for subsequently received queries based on the modified plan constraint specification if the modified plan constraint specification applies to those queries.

The modifications to the plan constraint specification may cause the plan constraint specification to larger sets of queries. For example, a user may eliminate certain tables from the plan constraint specification to make the plan constraint specification apply to queries that don't process the eliminated queries. The user may generalize certain attributes for example, by specifying "<any>" as the value of table distributions or join algorithms. Accordingly, the optimizer would consider alternative execution plans to select an appropriate execution plan for subsequent queries.

Alternative Applications

Several embodiments are described herein using a parallel database architecture. However, other embodiments based on a single processor architecture are foreseeable. Furthermore, examples presented are based on relational databases using SQL as language interface. However, other embodiments can be described that allow plan constraint specification of other types of database, for example, object based databases. Furthermore, the database query specification is not limited to SQL but can be any query language. The plan constraints may be specified programmatically, for example, by using an application programming interface.

Furthermore, although the parallel architecture is disclosed herein as having a leader node and a plurality of compute nodes, other parallel configurations can be used. For example, any one of the compute nodes can act as a leader node. The parallel architecture can be based on a shared memory. Alternatively, the parallel architecture may comprise a distributed system of independent computers interconnected via a network.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer-implemented method for limiting the execution plans evaluated by database system for queries, the method comprising:
   receiving a plan constraint specification for limiting execution plan choices for optimizing database queries specified independent of applicable database queries, the plan constraint specification identifying a plurality of tables and specifying attributes of execution plans, each of the plurality of tables identified by a table identifier in the plan constraint specification, the table identifier being a table name or an alias of the table;
   building a data structure representing the plan constraint specification;
   receiving a plurality of database queries;
   identifying, from the plurality of database queries, the applicable database queries to which the plan constraint specification applies by processing the database queries based on the data structure, comprising:
      matching the plurality of tables of the plan constraint specification against the database queries received by determining whether one or more of the database queries specify the table identifier for each of the plurality of tables identified in the plan constraint specification;
   for each identified applicable database query, generating an execution plan by applying the plan constraint specification to the applicable database query, comprising:
      optimizing the applicable database query by limiting the search for execution plans to a set of execution plans that satisfy the attributes of execution plans specified by the plan constraint specification;
      selecting the execution plan from the set of execution plans for executing the applicable database query; and
      sending the selected execution plan for executing the applicable database query.

2. The computer-implemented method of claim 1, wherein the plan constraint specification specifies a table constraint specifying distribution of a table in a parallel architecture.

3. The computer-implemented method of claim 1, wherein the plan constraint specification specifies a join constraint specifying the join mechanism for joining a pair of tables.

4. The computer-implemented method of claim 1, wherein the plan constraint specification specifies a cardinality of a table, wherein the search for execution plans is limited to execution plans that assume that the table has the specified cardinality, independent of the actual cardinality of the table.

5. The computer-implemented method of claim 1, wherein the plan constraint specification specifies a cardinality of an intermediate result corresponding to a join of a plurality of tables by the database query, wherein the search for execution plans is limited to execution plans that assume that the intermediate result has the specified cardinality, independent of the actual cardinality of the intermediate result.

6. The computer-implemented method of claim 1, wherein the plan constraint specification specifies a join order for joining two or more tables processed by the database query, wherein the search for execution plans is limited to execution plans that have the specified join order.

7. The computer-implemented method of claim 1, wherein the database query comprises a join condition based on a first pair of columns and a second pair of columns and the plan constraint specification specifies the first pair of columns as join columns, wherein the search for execution plans is limited to execution plans that perform a join based on the first pair of columns and a filter operation based on the second pair of columns.

8. The computer-implemented method of claim 1, wherein the plan constraint specification is mandatory for an optimizer of the database, such that the optimizer excludes all execution plans that do not conform to the plan constraint specification.

9. The computer-implemented method of claim 1, wherein the plan constraint specification specifies a distribution for a table as one of a hash distribution, broadcast distribution, or round robin distribution.

10. The computer-implemented method of claim 1, wherein the plan constraint specification specifies rows of a table to be stored in a sorted order based on a specified column, wherein the search for execution plans is limited to execution plans that assume that the rows of the table are sorted as specified.

11. The computer-implemented method of claim 1, wherein the plan constraint specification identifies tables by specifying aliases used in database queries.

12. The computer-implemented method of claim 1, wherein the plan constraint specification specifies a set of tables, such that the evaluated execution plans correspond to join orders formed by pairs from within the set of tables.

13. The computer-implemented method of claim 1, wherein the plan constraint specification specifies attributes for a group of tables joined in the query.

14. The computer-implemented method of claim 1, wherein the plan constraint specification specifies cardinality of a result of joining a group of tables in the database query.

15. The computer-implemented method of claim 1, wherein the plan constraint specification specifies distribution of a result of joining a group of tables in the database query.

16. The computer-implemented method of claim 1, wherein the plan constraint specification specifies a group of tables in the database query and a first table, such that each evaluated execution plan includes the first table in two-table joins of tables from the group of tables.

17. The computer-implemented method of claim 1, wherein the plan constraint specification specifies a final physical operator specifying the physical operator choice for an aggregation operation of the database query.

18. The computer-implemented method of claim 1, wherein the plan constraint specification specifies a query block of database queries to which a portion of the plan constraint is applicable.

19. The computer-implemented method of claim 18, wherein the plan constraint specification specifies the query block using one of a query identifier or a query block name.

20. The computer-implemented method of claim 1, wherein the plan constraint is a first plan constraint further comprising:
 receive a request to generate a plan constraint specification for an input query;
 generating an execution plan for the input query;
 generating the second plan constraint specification for the input query corresponding to the generated execution plan;
 receiving modifications to the second plan constraint specification; and
 storing the second plan constraint specification, wherein the second plan constraint is used for processing subsequent database queries received.

21. A computer readable non-transitory storage medium storing instructions thereon, the instructions for:
 receiving a plan constraint specification for limiting execution plan choices for optimizing database queries specified independent of applicable database queries, the plan constraint specification identifying a plurality of tables and specifying attributes of execution plans, each of the plurality of tables identified by a table identifier in the plan constraint specification, the table identifier being a table name or an alias of the table;
 building a data structure representing the plan constraint specification;
 receiving a plurality of database queries;
 identifying, from the plurality of database queries, the applicable database queries to which the plan constraint specification applies by processing the database queries based on the data structure, comprising:
  matching the plurality of tables of the plan constraint specification against the database queries received by determining whether one or more of the database queries specify the table identifier for each of the plurality of tables identified in the plan constraint specification;
 for each identified applicable database query, generating an execution plan by applying the plan constraint specification to the applicable database query, comprising:
  optimizing the applicable database query by limiting the search for execution plans to a set of execution plans that satisfy the attributes of execution plans specified by the plan constraint specification;
  selecting the execution plan from the set of execution plans for executing the applicable database query; and
  sending the selected execution plan for executing the applicable database query.

22. A computer-implemented system for limiting the execution plans evaluated by database system for queries, the system comprising:
 a computer processor; and
 a computer-readable storage medium storing instructions thereon, the instructions for:
 receiving a plan constraint specification for limiting execution plan choices for optimizing database queries specified independent of applicable database queries, the plan constraint specification identifying a plurality of tables and specifying attributes of execution plans, each of the plurality of tables identified by a table identifier in the plan constraint specification, the table identifier being a table name or an alias of the table;
 building a data structure representing the plan constraint specification;

receiving a plurality of database queries;
identifying, from the plurality of database queries, the applicable database queries to which the plan constraint specification applies by processing the database queries based on the data structure, comprising:
matching the plurality of tables of the plan constraint specification against the database queries received by determining whether one or more of the database queries specify the table identifier for each of the plurality of tables identified in the plan constraint specification;
for each identified applicable database query, generating an execution plan by applying the plan constraint specification to the applicable database query, comprising:
optimizing the applicable database query by limiting the search for execution plans to a set of execution plans that satisfy the attributes of execution plans specified by the plan constraint specification;
selecting the execution plan from the set of execution plans for executing the applicable database query; and
sending the selected execution plan for executing the applicable database query.

* * * * *